(12) United States Patent
Brosch et al.

(10) Patent No.: US 10,881,980 B2
(45) Date of Patent: Jan. 5, 2021

(54) SCRUBBER TRAY AND A WET SCRUBBER TOWER COMPRISING SUCH SCRUBBER TRAY

(71) Applicant: DOOSAN LENTJES GMBH, Ratingen (DE)

(72) Inventors: Bjorn Brosch, Essen (DE); Oguzhan Narin, Sprockhovel (DE); Andreas Karpinski, Wuppertal (DE); Jurgen Michael Benthele, Duisburg (DE); Hagen Mann, Cologne (DE)

(73) Assignee: DOOSAN LENTJES GMBH, Ratingen (DE)

( * ) Notice: Subject to any disclaimer, the term of this patent is extended or adjusted under 35 U.S.C. 154(b) by 161 days.

(21) Appl. No.: 16/067,293

(22) PCT Filed: Aug. 16, 2017

(86) PCT No.: PCT/EP2017/070707
§ 371 (c)(1),
(2) Date: Jun. 29, 2018

(87) PCT Pub. No.: WO2019/034243
PCT Pub. Date: Feb. 21, 2019

(65) Prior Publication Data
US 2019/0358560 A1    Nov. 28, 2019

(51) Int. Cl.
*B01D 3/30*    (2006.01)
*B01D 47/06*    (2006.01)
(Continued)

(52) U.S. Cl.
CPC ............. *B01D 3/30* (2013.01); *B01D 47/063* (2013.01); *B01D 53/18* (2013.01); *B01D 53/504* (2013.01); *B01D 53/79* (2013.01); *B01D 53/80* (2013.01)

(58) Field of Classification Search
CPC ........ B01D 3/30; B01D 47/063; B01D 53/18; B01D 53/504; B01D 53/79; B01D 53/80
(Continued)

(56) References Cited

U.S. PATENT DOCUMENTS

| | | | | |
|---|---|---|---|---|
| 1,170,308 | A | * | 2/1916 | Mertz ................... B01D 45/08 96/356 |
| 3,544,087 | A | * | 12/1970 | McIlvaine ............ B01D 47/027 261/81 |

(Continued)

FOREIGN PATENT DOCUMENTS

| | | |
|---|---|---|
| JP | 61-103524 A | 5/1986 |
| JP | 2005-199184 A | 7/2005 |
| JP | 2013-215691 A | 10/2013 |

OTHER PUBLICATIONS

International Search Report for PCT/EP2017/070707 dated Oct. 12, 2017 [PCT/ISA/210].

*Primary Examiner* — Charles S Bushey
(74) *Attorney, Agent, or Firm* — Invenstone Patent, LLC

(57) ABSTRACT

A scrubber tray for a wet scrubber tower of a flue gas purification device includes a multiplicity of spindles, arranged across an inner horizontal cross section of the wet scrubber tower. Adjacent spindles are arranged at a horizontal distance to each other. At least some of the spindles are pivot-mounted to allow a rotative movement around a corresponding spindle axis and to arrange the respective spindle at a predetermined rotation angle. At least some of the spindles are equipped each with at least one protrusion, which extends outwardly from the respective spindle. The spindles and protrusions are shaped and arranged to provide flow-through openings between adjacent spindles and protrusions respectively. Each flow-through opening defines a corresponding flow-through area, and they add up to 10%-80% of the inner horizontal cross section of the associated (Continued)

Figure 1A:
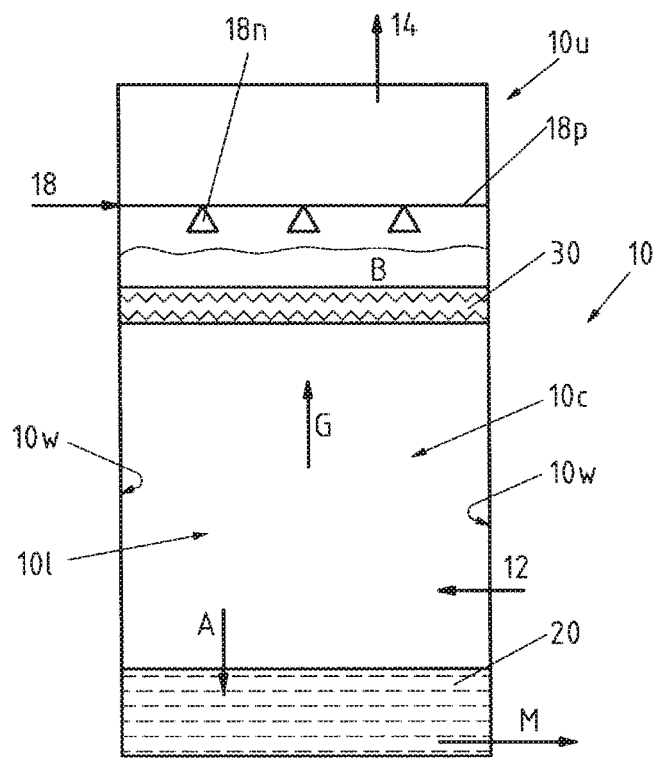

scrubber tower, independently of the respective rotation angles of the spindles.

13 Claims, 9 Drawing Sheets

(51) Int. Cl.
  *B01D 53/18* (2006.01)
  *B01D 53/50* (2006.01)
  *B01D 53/79* (2006.01)
  *B01D 53/80* (2006.01)

(58) Field of Classification Search
  USPC .......................................... 261/96, 109, 114.5
  See application file for complete search history.

(56) References Cited

U.S. PATENT DOCUMENTS

| | | | | |
|---|---|---|---|---|
| 3,591,947 A | * | 7/1971 | Sexton | B01D 47/021 96/259 |
| 3,726,064 A | * | 4/1973 | Rowley | B01D 45/10 96/324 |
| 3,730,499 A | * | 5/1973 | Jonakin | B01D 53/00 261/109 |
| 3,738,624 A | * | 6/1973 | McIlvaine | B01D 45/08 261/44.1 |
| 3,785,626 A | * | 1/1974 | Bradley, Jr. | B01D 1/16 261/36.1 |
| 3,807,711 A | * | 4/1974 | Hirao | B01D 3/163 261/44.1 |
| 3,976,455 A | * | 8/1976 | Dahlem | B01D 47/06 96/258 |
| 4,064,202 A | * | 12/1977 | Parenchuck | B01D 47/14 261/44.1 |
| 4,093,433 A | * | 6/1978 | Smith | B01D 53/18 96/259 |
| 4,206,159 A | * | 6/1980 | Angelini | B01D 47/10 261/109 |
| 4,981,500 A | * | 1/1991 | Krause | B01D 47/10 261/44.1 |
| 2015/0336049 A1 | | 11/2015 | Hakansson | |

* cited by examiner

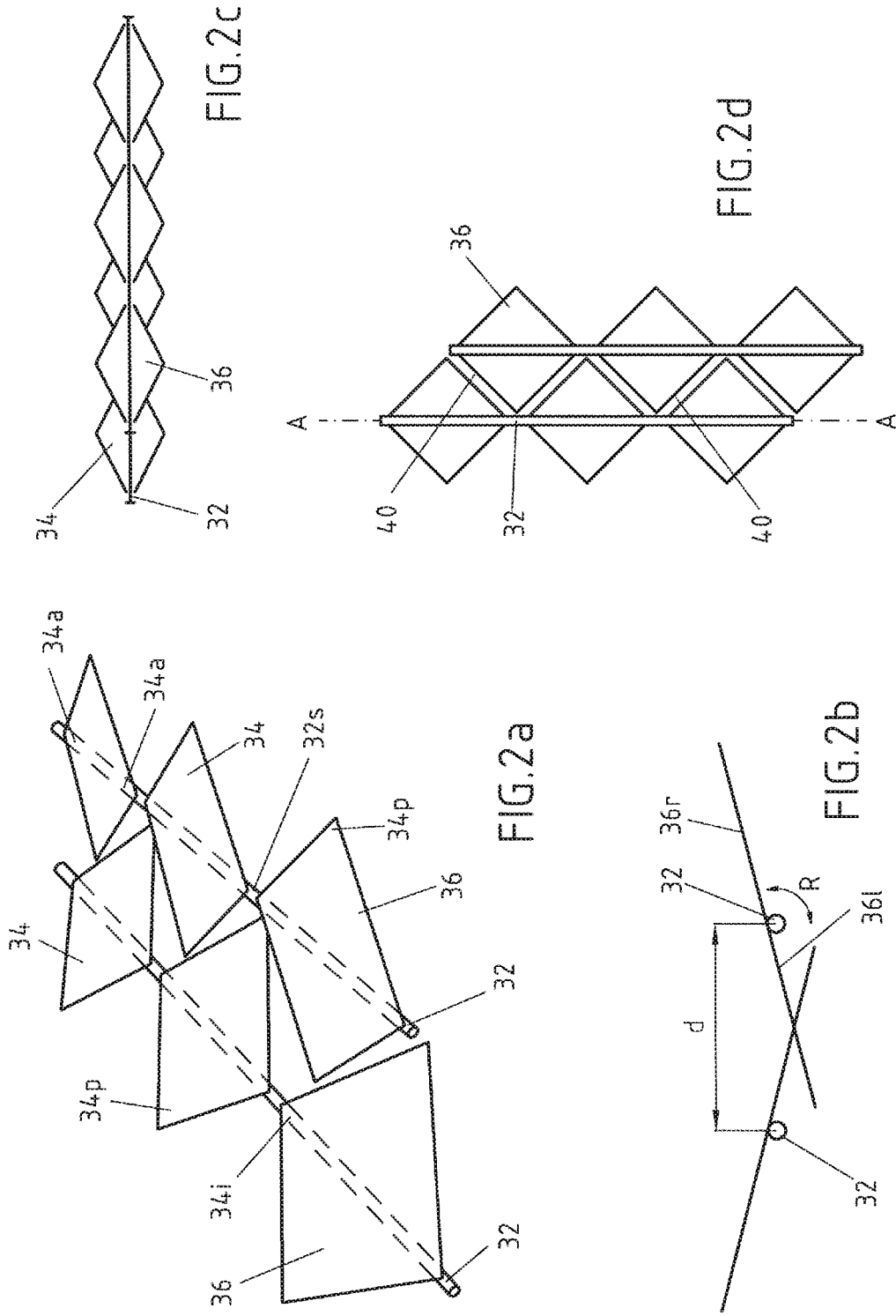

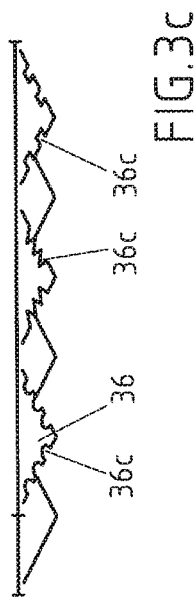
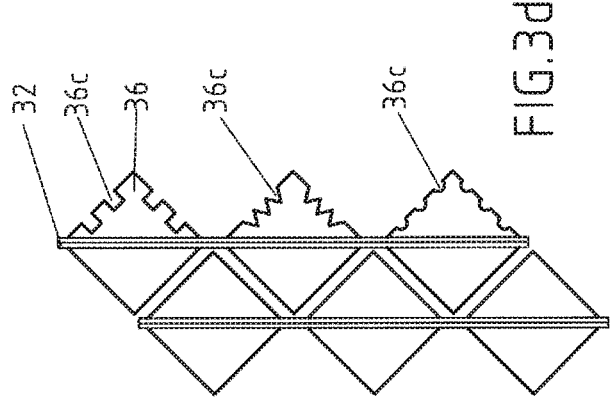
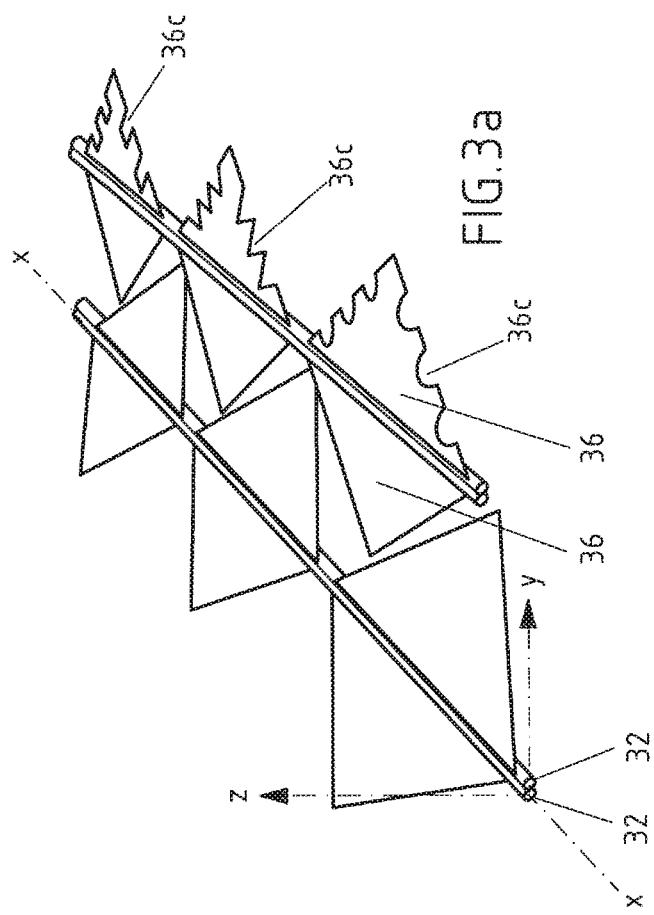
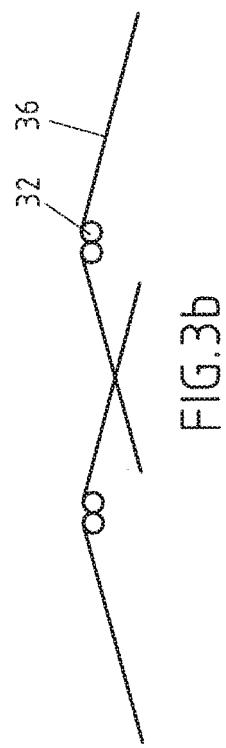

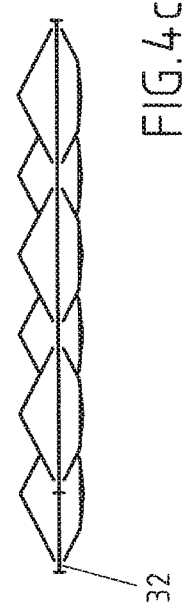
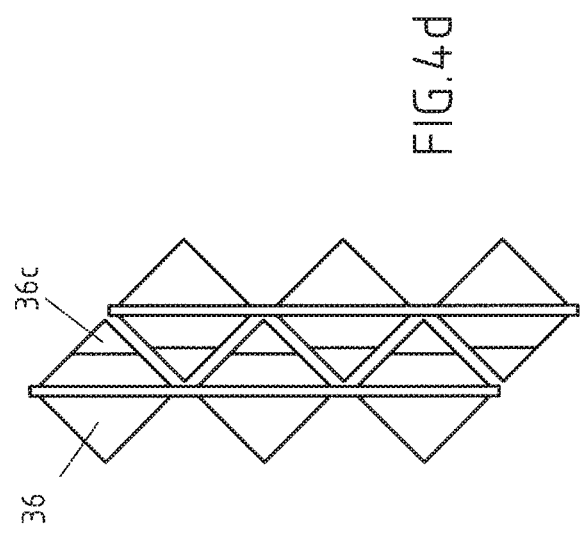
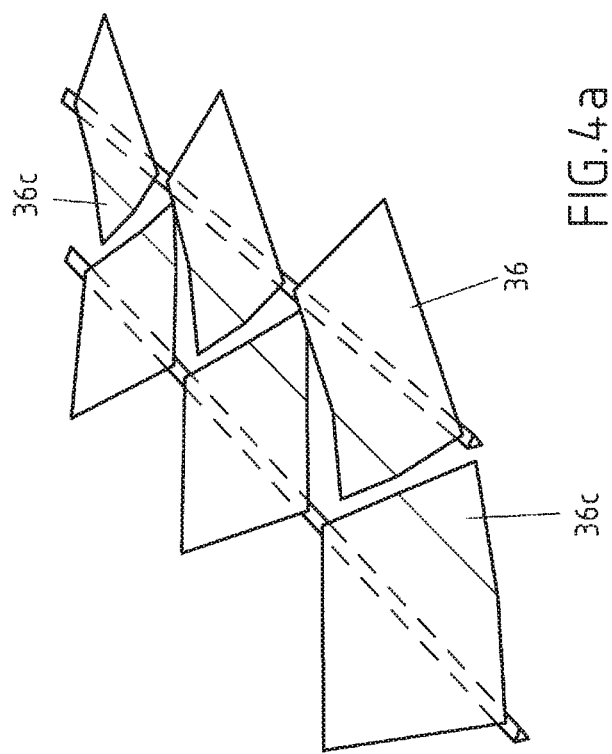
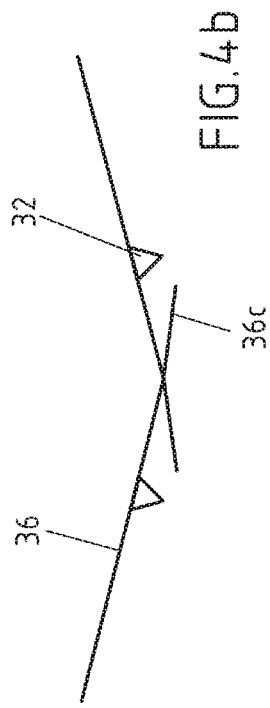
FIG.4c
FIG.4d
FIG.4a
FIG.4b

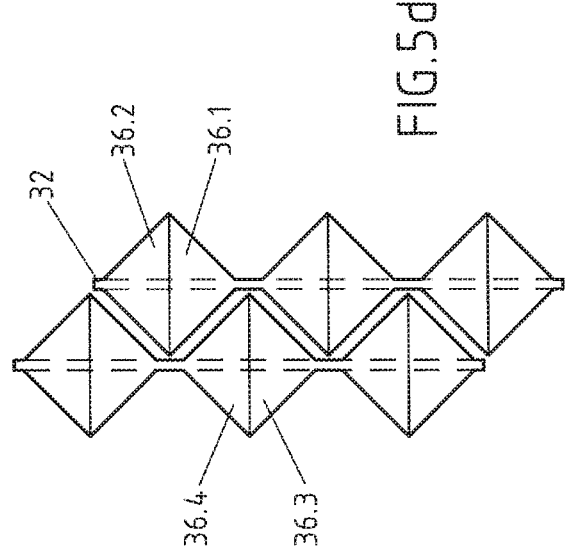
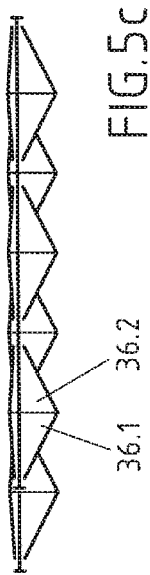
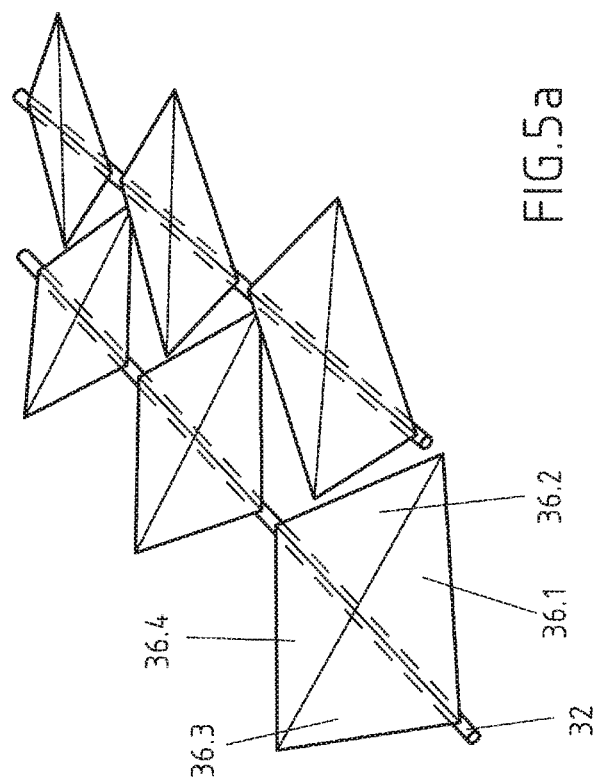
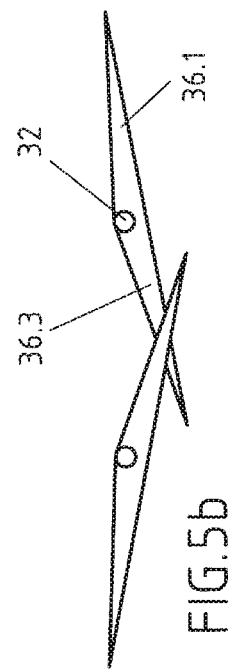

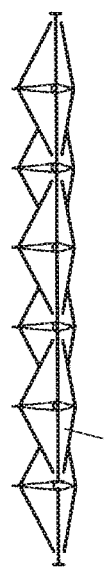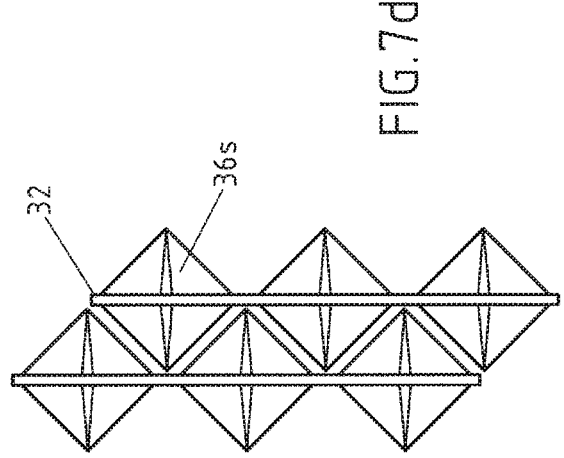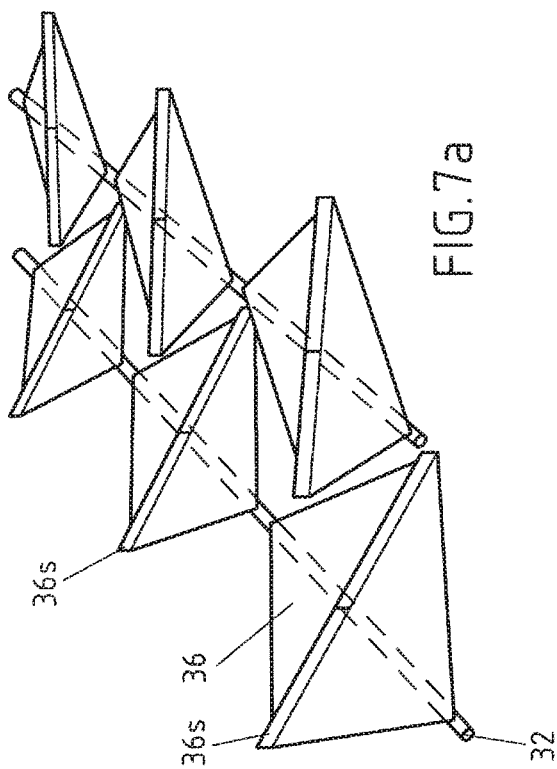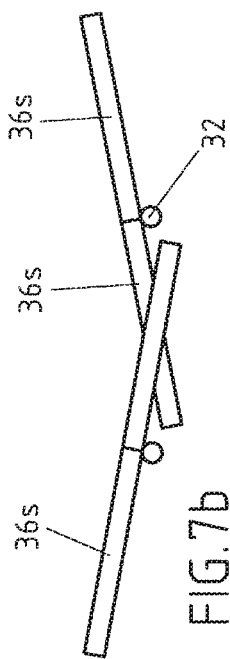

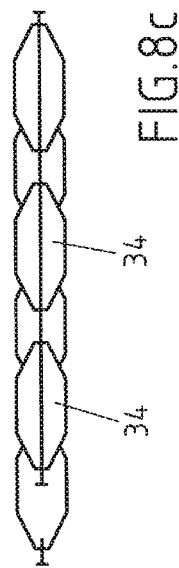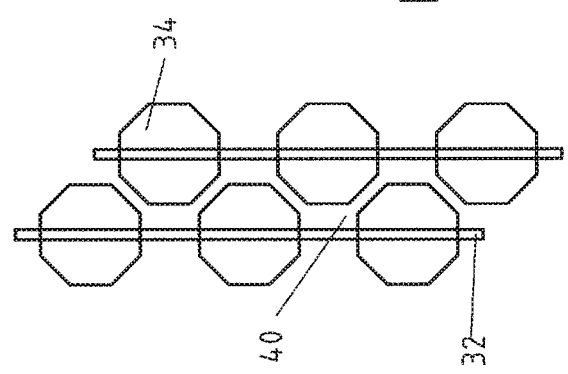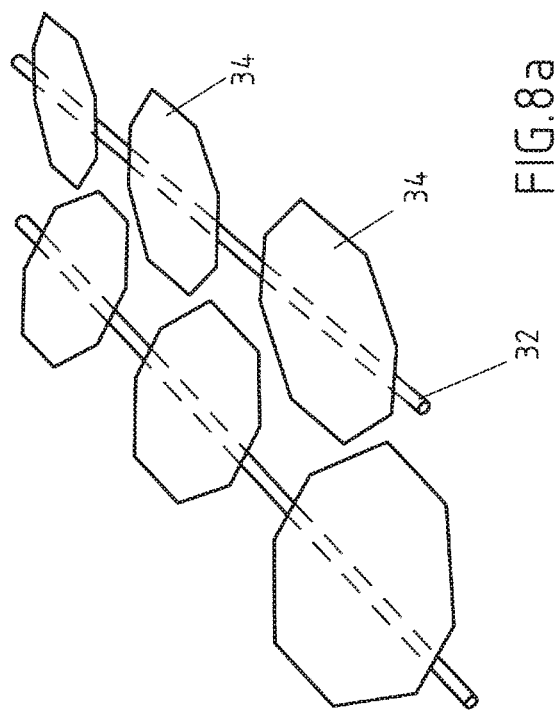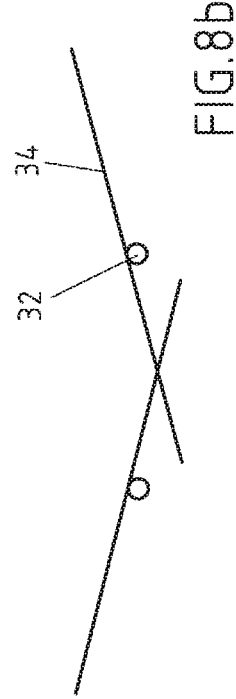

SCRUBBER TRAY AND A WET SCRUBBER TOWER COMPRISING SUCH SCRUBBER TRAY

CROSS REFERENCE TO RELATED APPLICATIONS

This application is a National Stage of International Application No. PCT/EP2017/070707 filed Aug. 16, 2017.

The invention relates to a scrubber tray and a scrubber tower (also called scrubbing tower, absorption tower, gas-liquid contact device or washing tower) of a flue gas purification device, which scrubber tower comprises at least one scrubber tray.

The invention particularly relates to a scrubber tray for gas purification device and a corresponding scrubber tower operating with seawater as a liquid (including a corresponding slurry) to absorb undesired components from the flue gas. That is why said liquid (fluid) is also called an absorbent or absorbing agent, while the tray is called a wet scrubber tray (U.S. Pat. No. 8,413,967B2) and the scrubber tower being called a wet scrubber tower.

Flue gas, which may derive from a power station, is often introduced at the lower part of the vertically extending scrubbing tower into the scrubbing tower—via a corresponding entrance—and further guided upwardly to a flue gas exit. Along its way through the scrubber tower the flue gas is brought into contact with the said liquid (fluid absorbent), often in a counter flow. In such an embodiment the absorbent is introduced into the scrubber tower above the flue gas inlet, e.g. at the upper end of the scrubber tower, thus defining the section between the flue gas entrance and the absorbent inlet as an absorbing zone, which represents a contact area for said liquid and said flue gas.

It is further known to arrange nozzles at the upper end of the absorbing zone, by which the fluid absorbent is sprayed (e.g. as droplets) into the contact area to provide a preferably large reaction surface with the flue gas to be purified.

The invention will be described hereinafter with respect to this generic design of a scrubber, but includes other designs as well, for example scrubber towers, where the gas is transported in a substantially horizontal flow direction.

The type of the liquid absorbents is not decisive as far as it absorbs and/or chemically interacts with the various components/impurities of the flue gas, such as sulphur oxides and $CO_2$.

U.S. Pat. No. 5,246,471 represents such a generic wet scrubber tower of a flue gas purification device, comprising a flue gas entrance and a flue gas exit, a liquid entrance and a liquid exit, a contact area for said flue gas and said liquid between said flue gas entrance and said liquid entrance and at least one scrubber tray, positioned within said contact area across an inner horizontal cross section of the wet scrubber tower, wherein each tray has flow through openings for said gas and said liquid absorbent.

In a process, wherein the liquid absorbent is temporarily stored onto the tray and a liquid bath formed, the flue gas, penetrating the liquid bath upwardly, gets into intimate contact with the absorbing liquid. As a consequence, the degree of absorption is increased.

The transfer area, which defines the reaction surface between gas and liquid in the contact area of a scrubber tower, depends—inter alia—from the gas volume (% by volume) within the liquid bath, the gas velocity within the contact zone, the (average) size of the gas bubbles and the vertical height of the liquid bath.

The degree of purification is dependent—inter alia—from the gas volume to be treated, the gas velocity, the size of the gas bubbles, the contact time between gas and liquid and the transfer area between gas and liquid.

Finer (smaller) gas bubbles increase the transfer area compared with larger bubbles (assuming both groups having the same total volume). The initial gas bubble diameter, i.e. the size of the gas bubbles when entering the liquid bath, again is dependent on the factors mentioned.

Modern power stations frequently vary their operating load, depending on the overall power demand, the type and quality of the energy source etc. This leads to considerable variations in the corresponding gas quantity, quality (gas composition) and gas velocity. In view of the parameters mentioned above the gas purification process often correlates with these parameters, i.e. the gas purification process is oversized or undersized. As a consequence, the gas purification does not fulfil the corresponding economical and ecological demands any more.

WO 2015/039779A1 discloses a tray, comprising openings of variable/alterable size and/or cross section. Depending on the respective operation mode of the associated plant (e.g. the power station) and thus depending on the corresponding quality, quantity and velocity of the flue gas, these openings may be adjusted (in particular reduced or enlarged in size to allow less or more gas/liquid to pass through) in a suitable way to achieve the best purification results. Preferred embodiments comprise trays with at least two layers, wherein the layers are displaceable relative to each other in order to vary the respective flow through openings, but displacement of a complete tray layer requires considerable forces and power. Another embodiment relates to a rotative movement of bars of square cross section, which bars are arranged at a distance to each other. This embodiment requires less activation forces and power, but its adjustability is limited due to a defined arrangement of bars with a defined profile.

It is an object of the present invention to improve the adaptability of a scrubber tray depending on the respective gas and absorbent qualities, quantities, velocities and other important process parameters like temperature, flow direction etc. Another object is to achieve an optimized contact (transfer area) between gas and liquid.

The invention is based on the following findings:

A preferred movability of a generic scrubber tray in order to adapt (vary) the flow through section of said tray and, as a consequence, the transfer area for said gas and absorbent may be achieved by physical elements, which are arranged in an adjustable manner within the contact area. Adjustability includes the respective position, orientation, size and shape. This adjustability allows to vary the size and shape of corresponding flow through openings or flow through channels (i.e. the relevant flow-through area) between adjacent elements by simply moving (e.g. turning, folding, rotating) of at least one of said elements.

Insofar said elements have the function of barriers, which may be moved into the flow through path/flow through area (the contact area) of the gas and liquid absorbent in order to control (increase or decrease) the transfer area.

It is a further finding of the invention to simplify this aspect by providing a pivoting/rotatable spindle (an axle) from which one or more corresponding elements protrude outwardly; this is why said barriers will be called protrusions hereinafter. By turning/rotating the spindle, the position (angle) of the corresponding protrusion(s) will be varied and thus the flow through area for the gas and for the absorbent. Such rotative movement is easy to achieve, requires low forces and power and allows to turn (or not) different spindles of the tray in arbitrary directions.

A third finding is that the transfer area between gas and absorbent can be influenced by the shape of these protrusions as will be described in more detail hereinafter.

In its most general embodiment the invention relates to a scrubber tray for a wet scrubber tower of a flue gas purification device, comprising a multiplicity of spindles, arranged across an inner horizontal cross section of the wet scrubber tower, wherein adjacent spindles are arranged at a horizontal distance to each other, wherein at least some of the spindles are pivot-mounted to allow a rotative movement of the respective spindle around a corresponding spindle axis and to arrange the respective spindle at a predetermined rotation angle, at least some of the spindles are equipped each with at least one protrusion, which extends outwardly from the respective spindle, the spindles and the protrusions are shaped and arranged to provide flow-through openings between adjacent spindles and protrusions respectively, wherein each flow-through opening defines a corresponding flow-through area, and the flow-through areas of all flow-through openings add up to at least 10% and do not exceed 80% of the inner horizontal cross section of the associated scrubber tower, independently of the respective rotation angles of the spindles.

This tray construction allows to adapt the flow-through area between the various spindles and protrusions as required by the respective flue gas purification process and the local dimensions and conditions by rotating one or more spindles together with their corresponding protrusions.

Different shapes and sizes of the protrusions allow to provide flow through openings/flow through areas of different shape and size and, as a consequence, to adapt the transfer area between gas and liquid in a predetermined manner.

Regarding the position, size and and shape of the protrusions, the following alternatives are within the scope of the invention, either as such or in arbitrary combinations if not explicitly excluded or technically absurd:

The protrusions can have a substantially 3-dimensional shape or a substantially 2-dimensional shape, wherein the latter has advantages over the first one. The 2-dimensional shape leads to a plate-like design, which provides favourable tearing (sharp) edges for the gas and absorbent, resulting in an increased transfer area. Such plate-like protrusions and their edges intensify the gas/liquid contacts by generating strong vortices adjacent to their outer periphery, which can be of different flow directions depending on the respective edge geometry. By circulating around the peripheral rims of such plate-like protrusions, thereby varying and extending the respective flow path, an intimate contact between gas and liquid can be achieved.

"Plate-like" refers to protrusions having a thickness which is considerably smaller than its extension along the other two Cartesian coordinates. The ratios length/thickness and/or width/thickness are typically set >10, >50 or >100, with a length/thickness ratio often being larger than the width/thickness ratio, wherein the length of a plate-like protrusion is defined as its extension in the direction of the spindle axis. "Plate-like" includes profiled protrusions, for example by bevelled edges, bevelled outer rims, chamfers, roof-like profiles etc. Outer rims (edges) with discontinuities, e.g. a saw-tooth or comb-shaped profile, enables additional vortices.

The spindles (axles) can feature a circular cross-section but square, rectangular or other cross-section profiles can be selected without causing substantial problems. Embodiments are preferred, featuring a spindle axis which extends through the center of area of the respective cross section.

The protrusions, especially plate-like protrusions, can be mechanically strengthened by reinforcements, stiffening means or profiling.

Such plate-like protrusions can be realized as metal sheets, for example of a thickness between 1 and 30 mm, mostly between 1 and 20 mm. The protrusions can extend radially with respect to the corresponding spindle axis, or tangentially with respect to the corresponding spindle surface, or can take a position in-between these two options. They can be fixed by welding, screwing etc. onto a corresponding spindle, The protrusions can be an integral part of the spindle (i.e. a one piece product). Alternatively the protrusions are discrete elements which are fixed to the spindle. In both cases the protrusions keep their function as distinct barrier means within the contact area of the scrubber tower.

Typical dimensions of a scrubbing tower are:
Height of the scrubbing tower: 10-50 m.
Circular horizontal cross section of up to 25 $m^2$, polygonal cross section with walls of 5-30 m width, etc.
Flue gas flowing through the scrubbing tower: 0.2-7.5 million $m^3/h$.
Liquid (absorbent) flowing through the scrubbing tower: 5,000-60,000 $m^3/h$.

This leads to spindles of more than 25 m length to traverse the scrubber tower. Insofar it is recommended to provide support members like support beams beneath the tray (level) or hangers above the tray (level) to support the tray installation, including its bearings.

According to these sizes at least two protrusions (often much more) will be arranged one after the other in the axial direction of the spindle (spindle axis), with or without any axial distance to each other. The position and size of adjacent protrusions allows to adjust a distance between these protrusions to provide corresponding through-openings for the gas and liquid absorbent. Additional flow-through openings are provided between adjacent protrusions of adjacent spindles, although the decisive adjustability results from altering the position of the protrusions. Additional flow-through openings can be provided by said spindles and/or protrusions. For this purpose the spindles and/or protrusions can be perforated, designed as grids/grates or the like.

Protrusions of one spindle can extend from the spindle surface in the same or different directions, in other words: they can be arranged at different angles with respect to the spindle axis. This allows to provide different flow-through openings between adjacent spindles depending on the position of the spindles and their protrusions respectively. Two or more protrusions can be arranged at one spindle one after the other in a direction parallel to the spindle axis.

The protrusions of at least one spindle can have an identical shape. The protrusions of adjacent spindles can match each other when brought into a position covering a maximum horizontal area. "Match" means, that corresponding protrusions can engage each other, thereby providing a substantially continuous barrier or gaps between adjacent protrusions to keep the required part (10-80% of the horizontal cross section) of the horizontal cross section of the scrubber tower permanently open.

Especially in embodiments, featuring protrusions which extend from the spindle in different directions, protrusions extending in a first direction may have a different shape (including the size) than protrusions which extend in a second direction, to achieve different transfer areas due to the specific blade angle of the protrusions relative to the spindle.

The outer profile of these protrusions can be selected depending on the process parameters of the scrubber tower and the required flue gas purification and includes: a triangle, a rectangle, a pentagon, a polygon, a pitch-circle, an oval, a star, a toothed rack, an undulation and a blossom. Correspondingly the size and shape of the flow-through openings between these protrusions changes.

As mentioned the spindles are rotated and brought into specific positions to allow different positions of the associated protrusions and different flow-through openings between the protrusions and spindles respectively. The invention allows to turn distinct spindles in different directions and/or to keep individual spindles unmoved, while turning others.

The tray and its components will typically be made out of metal (steel) but high performance plastics may be used at least partially.

The invention further includes a wet scrubber tower of a flue gas purification device, comprising a flue gas entrance and a flue gas exit, a liquid entrance and a liquid exit, a contact area for said flue gas and said liquid between said flue gas entrance and said liquid entrance, at least one scrubber tray, positioned within said contact area across an inner horizontal cross section of the wet scrubber tower, wherein said scrubber tray comprises a multiplicity of spindles, arranged across an inner horizontal cross section of the wet scrubber tower, wherein adjacent spindles are arranged at a horizontal distance to each other, wherein at least some of the spindles are pivot-mounted to allow a rotative movement of the respective spindle around a corresponding spindle axis and to arrange the respective spindle at a predetermined rotation angle, at least some of the spindles are equipped each with at least one protrusion, which extends outwardly from the respective spindle, the spindles and the protrusions are shaped and arranged to provide flow-through openings between adjacent spindles and protrusions respectively, wherein each flow-through opening defines a corresponding flow-through area, and the flow-through areas of all flow-through openings add up to at least 10% and do not exceed 80% of the inner horizontal cross section of the associated scrubber tower, independently of the respective rotation angles of the spindles.

While the lower threshold value for said minimum total flow-through area can be set >20%, >30% or >40% of the inner horizontal cross section of the scrubber tower, the upper threshold value can be adjusted at <70% or <60% or <50% with preferred ranges between 30-80% or 30-70% with all percentages relating to the inner horizontal cross section of the scrubber tower, which corresponds to the arrangement of the scrubber tray.

The uncovered part of the horizontal cross section of the scrubber tower corresponds to the flow-through area for the gas and liquid.

According to one embodiment the wet scrubber tower comprises at least one engine to put the spindles individually, in groups or commonly into a rotary motion. This can be done in a manner that spindles are driven in opposite directions.

The scrubber can also comprise a control unit, which activates the at least one engine, depending on a previously established analysis of the parameters (including the volume) of the flue gas to be purified, to move the spindles and their respective protrusions until the predetermined rotation angles of the spindles have been reached and the protrusions have been simultaneously moved into the calculated position.

Figure 1B:
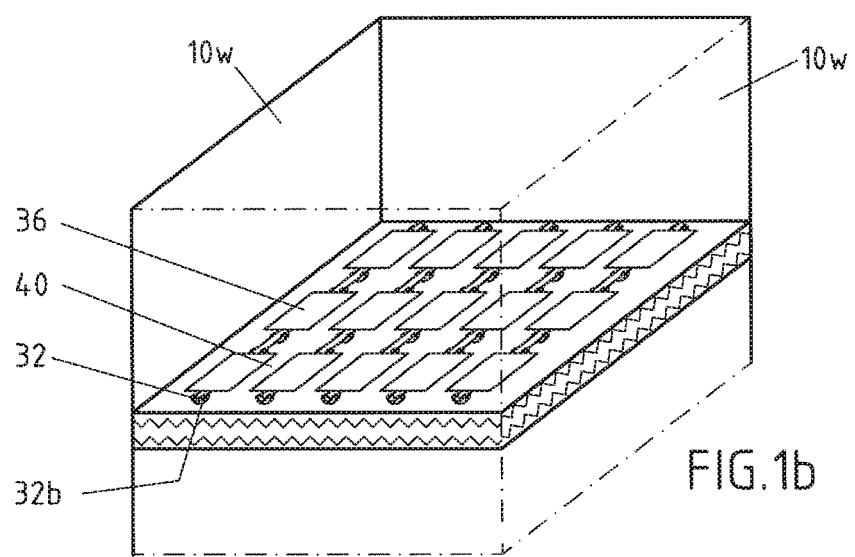
Figure 6C:
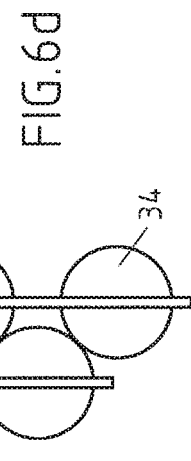
Figure 6D:
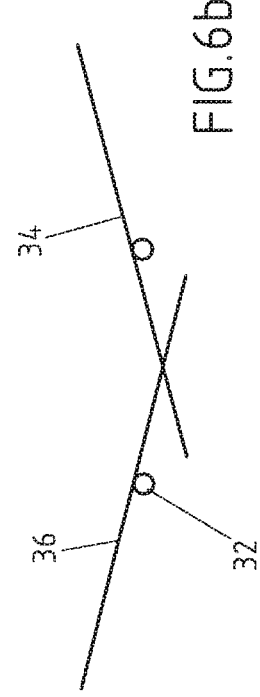
Figure 6A:
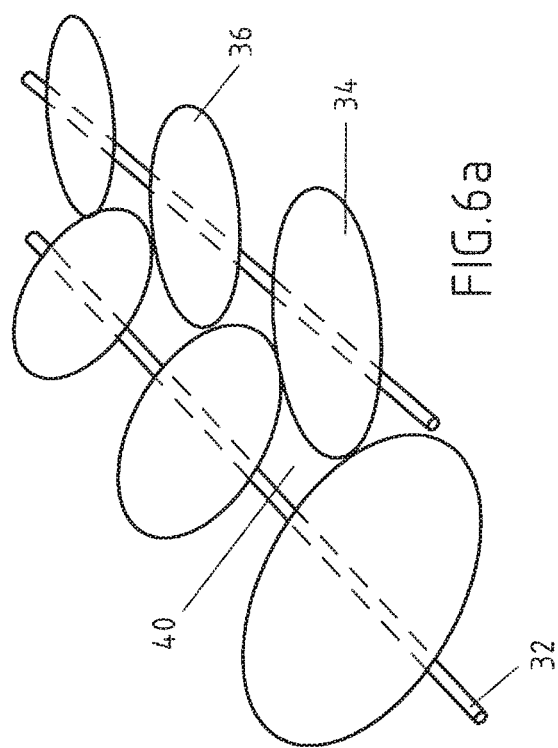
Figure 6B:
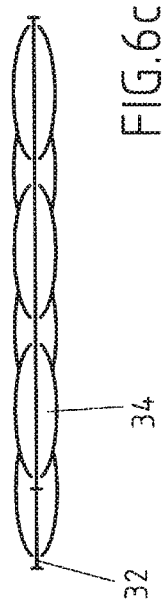
Figure 9:
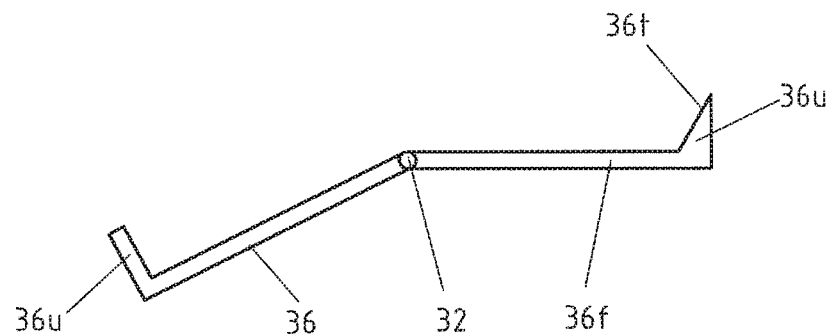
Figure 10:
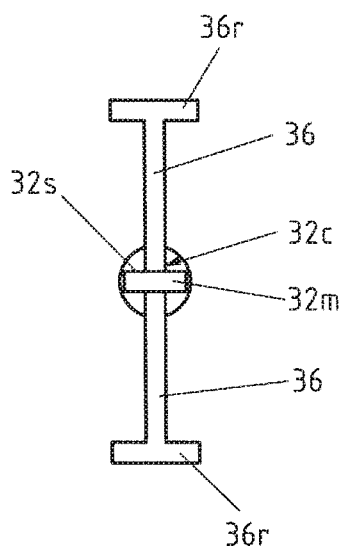

Further features of the invention can be derived from the features of the sub-claims as well as from the other applications documents, including the following description of examples, which may be realized individually or in arbitrary combinations if not excluded or technically absurd. The attached illustrations are only schematic and display in FIG. 1a: a schematic design of a generic scrubber tower in a vertical cross-sectional view;

FIG. 1b: a schematic 3D view onto a scrubber tray according to FIG. 1a;

FIGS. 2a, 2b, 2c and 2d: a first embodiment of a scrubber tray, wherein only a section of the tray is displayed, namely in a three-dimensional view from above in FIG. 2a, in a front view in FIG. 2b, in a side view in FIG. 2c and in a view from below in FIG. 2d;

FIGS. 3a, 3b, 3c and 3d: further embodiments each displayed analogously to FIGS. 2a, 2b, 2c and 2d;

FIGS. 4a, 4b, 4c and 4d: further embodiments each displayed analogously to FIGS. 2a, b, c and d;

FIGS. 5a, 5b, 5c and 5d: further embodiments each displayed analogously to FIGS. 2a, b, c, and d;

FIGS. 6a, 6b, 6c and 6d: further embodiments each displayed analogously to FIGS. 2a, b, c, and d;

FIGS. 7a, 7b, 7c and 7d: further embodiments each displayed analogously to FIGS. 2a, b, c and d;

FIGS. 8a, 8b, 8c and 8d: further embodiments each displayed analogously to FIGS. 2a, b, c, and d; and FIG. 9 and FIG. 10: vertical cross-sectional views of two other embodiments of spindles with corresponding protrusions.

In the Figures parts having the identical or equivalent function are referenced by the same numeral.

FIG. 1a represents the main features of a so-called wet scrubber tower 10 by which a flue gas from an associated power station (not illustrated) will be purified.

Scrubber tower 10 comprises four outer walls 10w, defining a square horizontal cross section, a flue gas entrance 12 at a lower part 10l and a flue gas exit 14 at an upper part 10u, a liquid (seawater) entrance 18 at the upper part 10u and the liquid exit 20 at the lower part 10l. Said liquid exit 20 corresponds to a so-called sump area beneath the lower part 10l of scrubber tower 10.

A seawater return line to the sea is marked by arrow M.

The liquid absorbent (seawater) is fed into the cylindrical space of scrubber tower 10 via nozzles 18n, attached to a pipe 18p, which follows the liquid entrance 18. The seawater absorbent takes its further way downwardly (arrow A) within the scrubber tower 10 (following gravity), thereby getting in contact with said flue gas, flowing upwardly (arrow G) between gas entrance 12 and gas exit 14 and in a counter current to the liquid absorbent. The flue gas flow is generated by a not illustrated fan.

The described counter flow area of liquid absorbent and flue gas defines the contact area (contact zone) 10c.

Within said contact area 10c a wet scrubber tray 30 is mounted, which extends over the total horizontal cross-sectional area of said scrubber tower 10 (FIG. 1b). This tray 30 urges the gas and the liquid respectively to penetrate (flow) through it. Insofar the tray, independently of its embodiment, always leaves open spaces 40 (flow through areas) to allow the transfer and contact of gas and liquid.

Above the tray, a foam-like phase B, being a mixture of liquid and gas, often develops during the gas purification process.

Main components of the tray are spindles 32 and barrier elements 34, attached to said spindles. The spindles 32 are either supported by beams (which preferably extend perpendicular to and beneath said spindles) and/or hangers and pivotally mounted in corresponding bearings 32b, e.g. at their respective ends, i.e. close to or in said walls 10w. Flow through openings 40 are provided between adjacent spindles and barrier elements respectively.

In the following various embodiments of said tray 30 will be illustrated.

FIGS. 2a, 2b, 2c and 2d refers to a first embodiment of said tray 30.

This tray 30 comprises a multiplicity of spindles 32 (two of which being displayed, each with a central longitudinal axis A-A), which are arranged with a distance (d) to each other between opposite walls 10w of the scrubber tower 10 and pivotally mounted with their respective ends in corresponding bearings (not displayed).

Square metal plates 34 are welded onto the spindles 32 in a symmetrical manner. While two opposite corners 34a of each square lie on a line, which itself lies in a plane through which a central longitudinal axis A of the spindle 32 extends, the remaining two corners 34p each define that part of a metal plate 34 being arranged furthest with respect to axis A.

By this design each metal plate 34 provides two triangular protrusions 36, extending in opposite directions from a corresponding surface area 32s of the respective spindle 32.

As may be seen in FIG. 2a, metal plates 34 (triangular protrusions 36) of adjacent spindles 32 are arranged offset in the axial direction of the spindles 32, which finally leads to a "matching profile" of adjacent spindles 32 and protrusions 36.

As may best be seen in a combination of FIGS. 2a, 2b and 2d "matching" does not mean that adjacent protrusions 36 abut each other or overlap each other, although such an arrangement will be possible; to the contrary: even when the spindles 32 have been turned (arrow R) and brought into a position when said protrusions 36 provide their largest horizontal extension, flow through openings 40 remain between adjacent protrusions 36 to allow the flue gas and liquid absorbent respectively to pass through.

The size of said flow through openings 40 can easily by varied/adjusted by turning one or more of said spindles 32 in a manner as displayed in FIGS. 2a, 2b and 2c. By turning at least one spindle 32, the corresponding protrusions 36 are tilted and brought into a different position vis-a-vis any adjacent spindle(s) 32/protrusion(s) 36, thereby altering the flow-through openings (flow-through area) correspondingly.

This allows to vary the size of the flow-through openings 40 depending on the process parameters—as mentioned above—in a simple manner, namely by rotating one or more of said spindles 32 with attached protrusions 36.

In the embodiment of FIG. 2, comprising protrusions 36 in opposite directions, a "double effect" can be achieved as may be derived from FIGS. 2a and 2b. By turning one spindle 32, one protrusion 36l moves downwardly while the opposite protrusion 36r moves upwardly with immediate consequences for the flow-through openings 40 on both sides of said spindle 32.

Similar effects but with different flow-through areas can be achieved by turning one spindle 32 while keeping the adjacent spindle 32 in its position or turning an adjacent spindle 32 in an opposite direction.

The embodiments displayed in FIGS. 3a, 3b, 3c, 3d, 4a, 4b, 4c, 4d, 5a, 5b, 5c, 5d, 6a, 6b, 6c, 6d, 7a, 7b, 7c, 7d, 8a, 8b, 8c and 8d are based on the same technical concept with variations in the design and arrangement of these spindles 32 and associated protrusions 36.

The embodiment according to FIGS. 3a, 3b, 3c and 3d differs from that of FIGS. 2a, 2b, 2c and 2d in that the triangular protrusions 36 are discrete elements and opposing protrusions 36 are fixed onto separate spindles 32 which are attached to each other by welding. The cross-section of the spindles changes from circular (at both ends) to rectangular (in between, but not displayed).

While opposing protrusions 36l,r according to FIGS. 2a, 2b, 2c and 2d are flush with each other (because of the one plate design), opposing protrusions 36l,r according to the embodiment of FIGS. 3a, 3b, 3c and 3d provide an angle of about 160° between each other. The profile of corresponding flow-through openings 40 between adjacent spindles/protrusions 32, 36 varies correspondingly, always depending on the angle of rotation of each of adjacent spindles 32.

The embodiment of FIGS. 4a, 4b, 4c and 4d are similar to that of FIGS. 2a, 2b, 2c and 2d with the proviso that all spindles 32 feature a triangular cross section and corner areas 36c of some of said triangular protrusions 36 extend under an angle smaller or larger 180° with respect to the remaining part of the respective protrusion 36. This again leads to different profiles of the corresponding flow-through openings 40 between adjacent protrusions 36.

The embodiment of FIGS. 5a, 5b, 5c and 5d starts from the embodiment of FIGS. 2a, 2b, 2c and 2d with the proviso that the metal plates 34 have a prismatic shape comprising four protrusion areas (36.1, 36.2, 36.3, 36.4) with angles unequal 180° between adjacent areas (36.1, 36.2; 36.2, 36.3; 36.3, 36.4; 36.4, 36.1).

The embodiment according to FIGS. 6a, 6b, 6c and 6d resembles resemble that of FIGS. 2a, 2b, 2c and 2d with the proviso that the square metal plates 34 have been replaced by circular metal plates 34. As a consequence protrusions 36 each have a semi-circular shape and flow-through openings 40 in between receive a correspondingly adapted profile.

The embodiment of FIGS. 7a, 7b, 7c and 7d displays display a tray construction with spindles 32 and metal plates 34 (protrusions 36) similar to that of FIGS. 2a, 2b, 2c and 2d, but with rebated joints (notches, stiffening means) 36s on one side (the upper side as displayed) in FIG. 2a for reinforcement purposes.

The embodiment of FIGS. 8a, 8b, 8c and 8d displays display metal plate 34 of polygonal shape with eight corners, wherein the metal plates 34 of one spindle 32 are arranged at a distance to each other to provide larger flow-through openings for the gas and liquid in between.

FIG. 9 discloses a spindle 32, from which plate-like protrusions 36 of different shape and different size extend into different directions. In the position displayed a first protrusion extends radially outwardly, comprising a first section 36f (extending in a 3 o'clock direction) and a second section 36u following the first section 36f under an angle of about 90 degrees upwardly, which second section 36u features a knife-like terminal end 36t (in the Figure: the upper end). The second protrusion extends with a first section from said spindle 32 in a 7 o'clock direction and features a second section, following the first section at a right angle. Compared with the first protrusion the first section of the second protrusion is of less length and its second section features the same thickness as the first section.

The embodiment of FIG. 10 displays a rail-like spindle 32, which is characterized by a middle part 32m of rectangular cross section, followed at its both ends by circular cross-sectional profiles 32c, matching corresponding pivot bearings (not displayed).

One plate like protrusion 36 extends perpendicular from each of opposing surface sections 32s of the middle part 32m of said spindle 32. Each protrusion features a stop-ridge 36r at its free end, i.e. an overall T-shape in a vertical cross-sectional view to provide additional Vortex-edges.

In FIGS. 3a, 3b, 3c and 3d examples of plate-like protrusions 36 with additional optional features are displayed: The outer rim of the protrusions disclosed on the right in FIGS. 3a, and 3d are not designed in a straight line but features numerous discontinuities 36c to support the formation of additional vortices within the gas or gas/liquid mixtures, passing these rims. The discontinuities are of rectangular shape (top right), triangular shape (mid right) or semicircle geometry (bottom right) similar to a saw-tooth or comb-shaped profile. Adjacent protrusions of an adjacent spindle can be designed accordingly.

FIGS. 3a, 3b, 3c and 3d also display the three directions of the Cartesian Coordinate System with axis x, y and z, wherein x corresponds to the extension of the spindle axis and said protrusions predominantly extend in the y and x direction, while being inclined in the z-direction.

Examples of absolute dimensions (extensions) of one protrusion 36 are:
- in the x-direction: 0.03 to 25 meter, with alternative lower limits at 0.2 or 0.5 meter and alternative upper limits at 1 meter, 3 meters, 5 meters or 12.5 meters.
- in the y-direction: 0.05 to 1.0 meter, with alternative lower limits at 0.1 or 0.2 meter and alternative upper limits at 0.2 meter, 0.5 meters or 0.7 meter.

The invention claimed is:

1. A scrubber tray for a wet scrubber tower (10) of a flue gas purification device, the scrubber tray comprising
a) a plurality of spindles (32) arranged across an inner horizontal cross section of the wet scrubber tower (10), the plurality of spindles (32) including adjacent spindles (32) spaced apart from each other by a horizontal distance (d), wherein
b) at least some of the plurality of spindles (32) are pivot-mounted to allow a rotative movement of the respective spindle (32) around a corresponding spindle axis (A) and to arrange the respective spindle (32) at a predetermined rotation angle,
c) each of at least some of the plurality of spindles (32) is equipped with at least two protrusions (36), each of the at least two protrusions extending outwardly from the respective spindle (32) and being disposed on a line parallel to a spindle axis (A) that is arranged in a longitudinal direction, the at least two protrusions being separated from each other in the longitudinal direction, and
d) the plurality of spindles (32) and the at least two protrusions (36) are shaped and arranged such that a flow-through opening (40) is defined between the adjacent spindles and between the at least two protrusions (36) of the adjacent spindles (32), the flow-through opening (40) having a flow-through area comprising between 10% and 80% of the inner horizontal cross section of the wet scrubber tower (10), independently of the respective rotation angles of the plurality of spindles (32).

2. The scrubber tray according to claim 1, wherein at least some of the at least two protrusions (36) include a plate.

3. The scrubber tray according to claim 1, wherein at least some of the at least two protrusions (36) extend tangentially relative to the corresponding spindle.

4. The scrubber tray according to claim 1, wherein at least some of the at least two protrusions (32) include outer rims having discontinuities (36c) configured to enable additional vortices.

5. The scrubber tray according to claim 1, wherein at least some of the at least two protrusions (36) feature stiffening means (36s).

6. The scrubber tray according to claim 1, wherein at least some of the at least two protrusions (36) include a plate having a peripheral shape of the group comprising a triangle, a rectangle, a pentagon, a polygon, a pitch-circle, an oval, a star, a toothed rack, an undulation, and a blossom.

7. The scrubber tray according to claim 1, wherein the plurality of spindles (32) include at least one spindle (32) with at least two protrusions (36), which extend in different directions relative to the spindle axis (A).

8. The scrubber tray according to claim 1, wherein at least one of said at least two protrusions (36) is made of a metal sheet.

9. The scrubber tray according to claim 1, which wherein the plurality of spindles (32) are rotatable individually, in groups, or all together.

10. A wet scrubber tower (10) of a flue gas purification device, the wet scrubber tower comprising
a) a flue gas entrance (12) and a flue gas exit (14),
b) a liquid entrance (18) and a liquid exit (20),
c) a contact area (10c) for said flue gas and said liquid between said flue gas entrance (12) and said liquid entrance (18),
d) a scrubber tray (30) according to claim 1, the scrubber tray (30) including at least one scrubber tray (30) positioned within said contact area (10c) across the inner horizontal cross section of the wet scrubber tower (10).

11. The wet scrubber tower (10) according to claim 10, further comprising at least one engine to bring the plurality of spindles (32) individually, in groups, or commonly into a rotary motion.

12. The wet scrubber tower (10) according to claim 10, wherein different spindles (32) of the plurality of spindles (32) are rotatable in opposite directions.

13. The wet scrubber tower (10) according to claim 10, further comprising a control unit, which activates the at least one engine depending on a previously established analysis and volume of the flue gas to be purified, to move the plurality of spindles (32) and their respective protrusions (36) until predetermined rotation angles have been reached.

* * * * *